United States Patent
Huang et al.

(10) Patent No.: US 11,485,015 B2
(45) Date of Patent: Nov. 1, 2022

(54) SYSTEM FOR ELIMINATING INTERFERENCE OF RANDOMLY STACKED WORKPIECES

(71) Applicant: HIWIN TECHNOLOGIES CORP., Taichung (TW)

(72) Inventors: Mei-Yu Huang, Taichung (TW); Ming-Shiou Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 772 days.

(21) Appl. No.: 16/281,116

(22) Filed: Feb. 21, 2019

(65) Prior Publication Data

US 2020/0269422 A1 Aug. 27, 2020

(51) Int. Cl.
| | |
|---|---|
| *G05B 19/04* | (2006.01) |
| *G05B 19/18* | (2006.01) |
| *B25J 9/16* | (2006.01) |
| *G06V 10/75* | (2022.01) |
| *G06V 20/10* | (2022.01) |
| *G06V 20/64* | (2022.01) |

(52) U.S. Cl.
CPC .......... *B25J 9/1666* (2013.01); *B25J 9/1669* (2013.01); *G06V 10/7515* (2022.01); *G06V 20/10* (2022.01); *G06V 20/64* (2022.01); *G05B 2219/40053* (2013.01); *G05B 2219/40485* (2013.01)

(58) Field of Classification Search
CPC ... B25J 9/1666; B25J 9/1669; G06K 9/00201; G06K 9/00664; G06K 9/6203; G05B 2219/40053; G05B 2219/40485
See application file for complete search history.

(56) References Cited

U.S. PATENT DOCUMENTS

| | | | |
|---|---|---|---|
| 2013/0166061 A1* | 6/2013 | Yamamoto | B25J 9/1697 700/214 |
| 2014/0316573 A1* | 10/2014 | Iwatake | B25J 9/1697 700/258 |
| 2015/0003678 A1* | 1/2015 | Watanabe | B25J 9/1697 382/103 |
| 2016/0221187 A1* | 8/2016 | Bradski | B25J 9/1694 |

(Continued)

FOREIGN PATENT DOCUMENTS

| | | |
|---|---|---|
| CN | 102164718 A | 8/2011 |
| CN | 103921274 A | 7/2014 |

(Continued)

*Primary Examiner* — Harry Y Oh
*Assistant Examiner* — Sohana Tanju Khayer
(74) *Attorney, Agent, or Firm* — Winston Hsu

(57) ABSTRACT

A system for eliminating interference of randomly stacked workpieces is disclosed. The system includes a three-dimensional sensing module, a pick-up apparatus and a control module. The control module is coupled to the three-dimensional sensing module and the pick-up apparatus. The control module is configured to control the three-dimensional sensing module to capture a three-dimensional image, analyze the three-dimensional image to obtain an image information, select a target workpiece to be picked up according to the image information, arrange an interference elimination path for the target workpiece, and control the pick-up apparatus to eliminate interference of the target workpiece according to the interference elimination path.

10 Claims, 9 Drawing Sheets

(56) References Cited

U.S. PATENT DOCUMENTS

| | | | |
|---|---|---|---|
| 2016/0279791 A1* | 9/2016 | Watanabe | G06K 9/00201 |
| 2017/0154430 A1* | 6/2017 | Yoshii | G06T 7/70 |
| 2019/0143508 A1* | 5/2019 | Nishina | B25J 13/086 |
| | | | 700/258 |
| 2019/0248003 A1* | 8/2019 | Nagarajan | B25J 9/1612 |
| 2019/0351549 A1* | 11/2019 | Suzuki | B25J 15/0042 |
| 2019/0375110 A1* | 12/2019 | Oishi | B25J 9/1697 |
| 2019/0375602 A1* | 12/2019 | Katagiri | B25J 9/1697 |

FOREIGN PATENT DOCUMENTS

| | | | |
|---|---|---|---|
| JP | 3930490 | B2 | 6/2007 |
| JP | 6357785 | B2 | 7/2018 |

* cited by examiner

SYSTEM FOR ELIMINATING INTERFERENCE OF RANDOMLY STACKED WORKPIECES

BACKGROUND OF THE INVENTION

1. Field of the Invention

The present disclosure relates to a system for picking up objects, and more particularly, to a system for picking up randomly stacked workpieces.

2. Description of the Prior Art

With the advancement of technology, robots have been widely applied to industrial manufacturing so as to promote production line automation, increase production efficiency and reduce labor costs. For example, when assembling a product, the robot is often used as a pick-up apparatus. Conventionally, the workpieces are regularly arranged on a conveyor or in a container, such as a tray or a box, before being gripped. As such, each of the workpieces is independent of each other so as to enhance the probability of the successful grip of the robot. However, arranging the workpieces in advance requires labors and time, which is unfavorable for automation of production line and production efficiency and results in labor consuming.

For solving the aforementioned problem, systems for picking up randomly stacked workpieces are developed. In one of the systems, the workpieces are disposed in a box. When the robot cannot find any workpiece to be gripped due to serious interference between the workpieces (i.e., the gripped portion of each of the workpieces is covered by the other workpieces), the robot grips and shakes the box for changing the relative positions of the workpieces. Accordingly, it provides the chance that the gripped portion of at least one of the workpieces can be exposed to be gripped by the robot. However, shaking of the box cannot ensure the gripped portion of at least one of the workpieces to be exposed. In addition, when the workpieces get stuck with each other, the stuck state cannot be released by shaking due to irregular shape of the workpiece. Furthermore, when the workpiece is made of metal or material with a larger specific gravity, the total weight of the workpieces and the box is considerable. The robot should be capable of bearing the total weight, thereby the specification of the robot is enhanced.

In another one of the systems, a robotic arm is applied to stir the randomly stacked workpieces. However, each stir still cannot ensure the gripped portion of at least one of the workpieces to be exposed. In addition, during the stir, the impact of the workpieces on the robotic arm tends to damage the robotic arm. Accordingly, the life of the robotic arm is reduced.

In yet another one of the systems, after gripping an object, the robot determines whether the object is a single workpiece or a plurality of workpieces entangled together. When the robot determines that the object is the plurality of workpieces entangled together, the robot throws the object back to the box and performs a next grip. However, it still cannot ensure the success of the next grip. Therefore, it is difficult to enhance the production efficiency of the systems for picking up randomly stacked workpieces.

SUMMARY OF THE INVENTION

According to an embodiment of the present disclosure, a system for eliminating interference of randomly stacked workpieces is disclosed. The system includes a three-dimensional sensing module, a pick-up apparatus and a control module. The control module is coupled to the three-dimensional sensing module and the pick-up apparatus. The control module is configured to: control the three-dimensional sensing module to capture a three-dimensional image, wherein the three-dimensional image is formed by capturing at least one portion of the workpieces; analyze the three-dimensional image to obtain an image information; select a target workpiece to be picked up according to the image information; arrange an interference elimination path for the target workpiece, which includes the control module dividing the target workpiece into a plurality of regions, the control module calculating an interference parameter of each of the regions, and the control module sorting the regions according to the interference parameter of each of the regions to obtain the interference elimination path; and control the pick-up apparatus to eliminate interference of the target workpiece according to the interference elimination path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
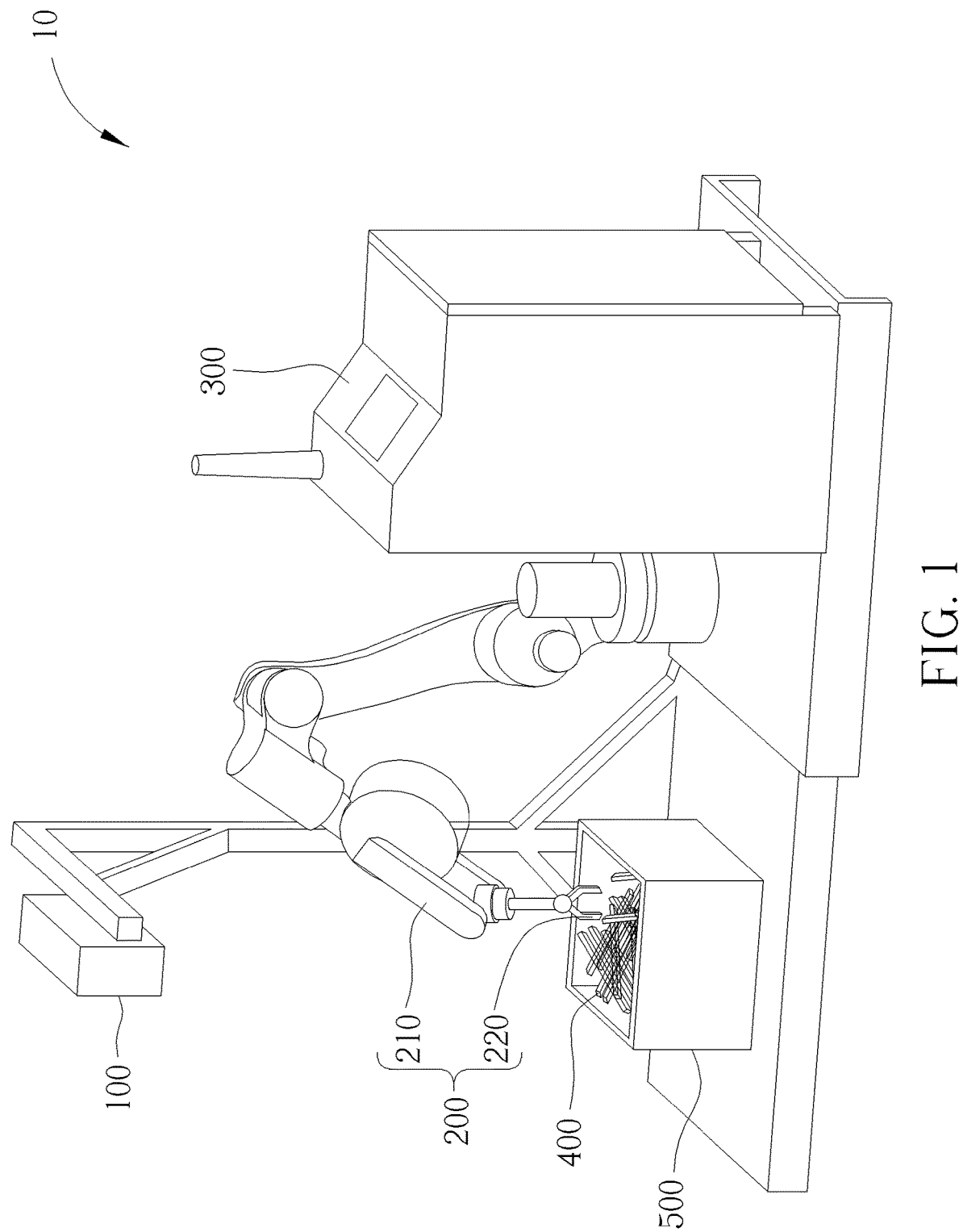
FIG. 1 is a schematic diagram of a system and workpieces according to one embodiment of the present disclosure.
Figure 2:
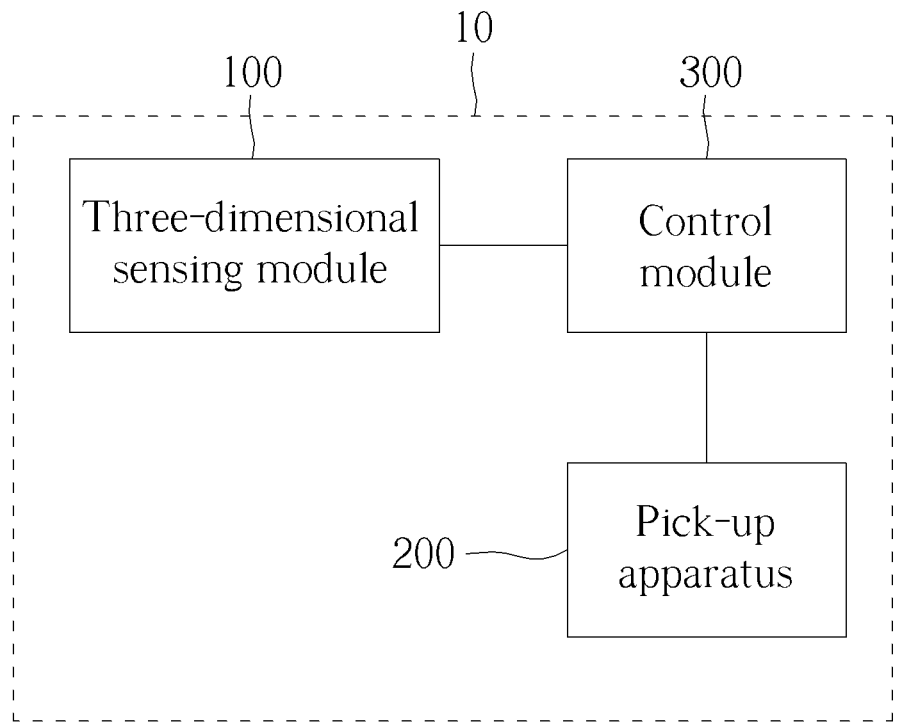
FIG. 2 is a functional block diagram of the system of FIG. 1.
Figure 3:
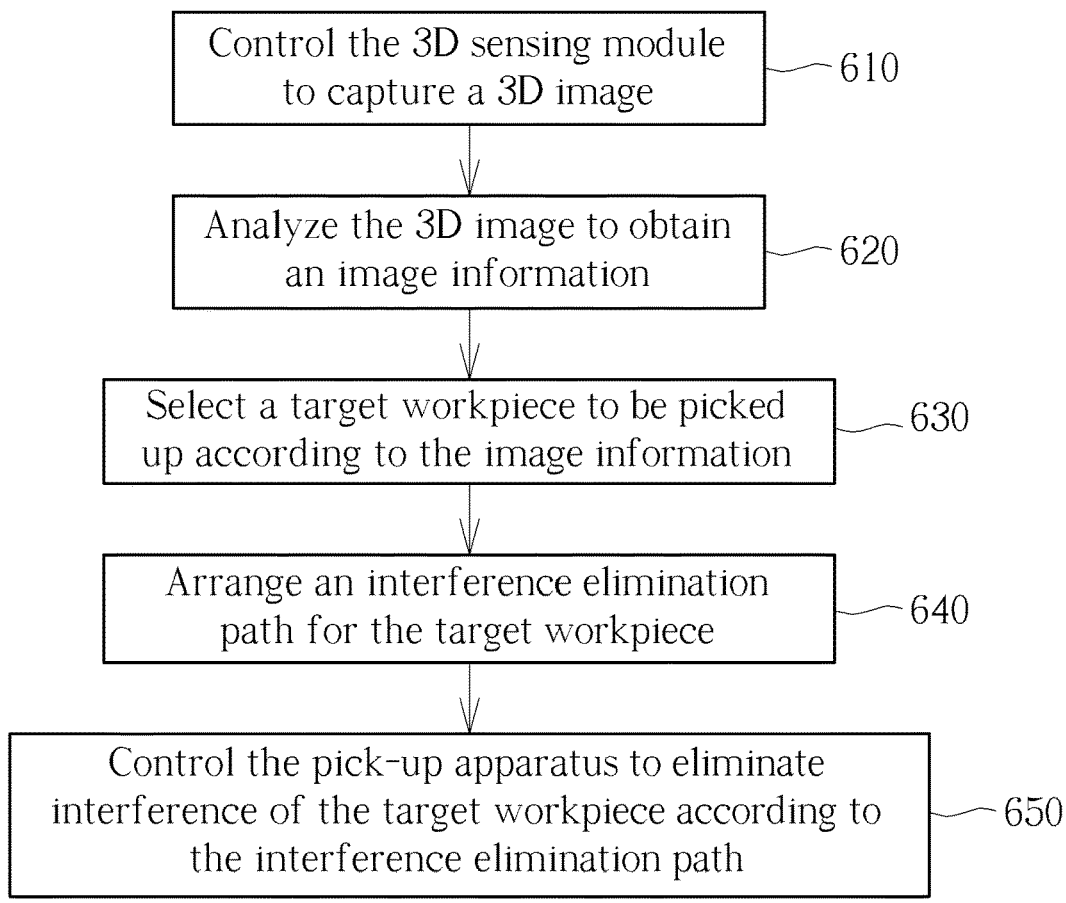
FIG. 3 is a flow chart illustrating a control module configured to eliminate interference.
Figure 4:
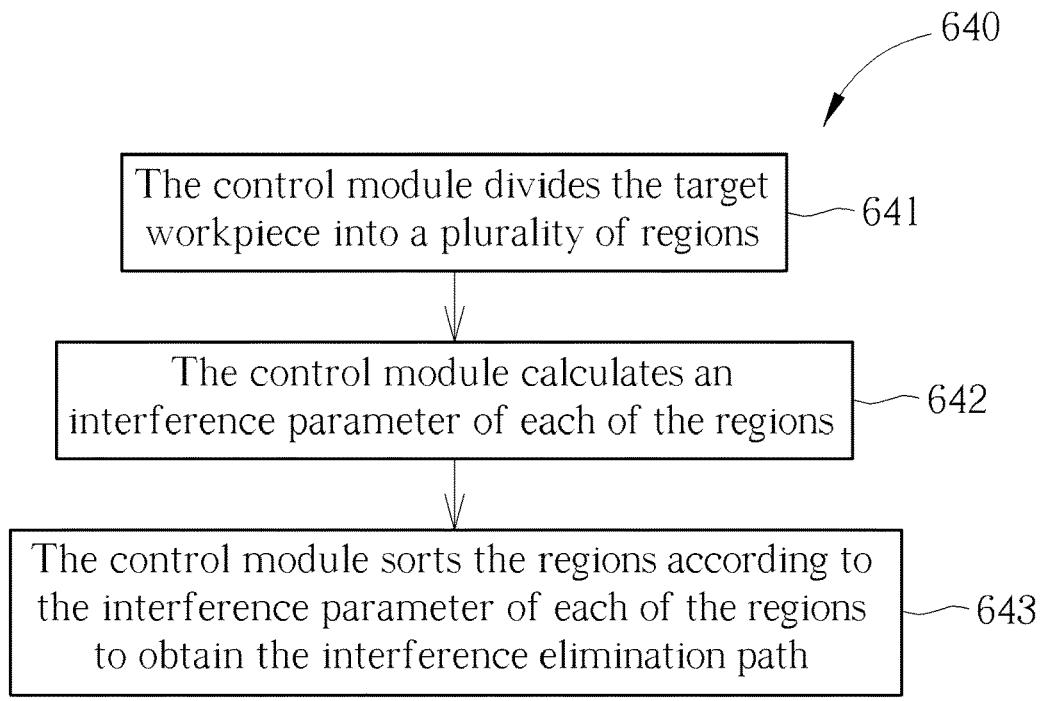
FIG. 4 is a flow chart for Step 640 of FIG. 3 in detail.

Please refer to FIG. 1 and FIG. 2. FIG. 1 is a schematic diagram of a system 10 and workpieces 400 according to one embodiment of the present disclosure. FIG. 2 is a functional block diagram of the system 10 of FIG. 1. The present disclosure provides the system 10, which can be applied to eliminate interference of the randomly stacked workpieces 400. The system 10 includes a three-dimensional (3D) sensing module 100, a pick-up apparatus 200 and a control module 300. The control module 300 is coupled to the 3D sensing module 100 and the pick-up apparatus 200. Please refer to FIG. 3. FIG. 3 is a flow chart illustrating the control module 300 configured to eliminate interference, which includes Steps 610-650. In Step 610, the control module 300 controls the 3D sensing module 100 to capture a 3D image, wherein the 3D image is formed by capturing at least one portion of the workpieces 400. In Step 620, the control module 300 analyzes the 3D image to obtain an image information. In Step 630, the control module 300 selects a target workpiece (not labelled) to be picked up according to the image information. In Step 640, the control module 300 arranges an interference elimination path for the target workpiece. In Step 650, the control module 300 controls the pick-up apparatus 200 to eliminate interference of the target workpiece according to the interference elimination path. Please refer to FIG. 4, which is a flow chart for Step 640 of FIG. 3 in detail. Step 640 can include Steps 641-643. In Step 641, the control module 300 divides the target workpiece into a plurality of regions. In Step 642, the control module 300 calculates an interference parameter of each of the regions. In Step 643, the control module 300 sorts the regions according to the interference parameter of each of the regions to obtain the interference elimination path.

Specifically, the system 10 can be applied to eliminate interference of the workpieces 400 which are randomly stacked. As shown in FIG. 1, the kinds and shapes of the workpieces 400 can be identical (for example, the workpieces 400 in FIG. 1 are all columnar workpieces) and randomly stacked in a box 500. However, the present disclosure is not limited thereto. According to practical demands, the workpieces 400 can be disposed in other carriers or containers, such as conveyors or trays, and the workpieces 400 can be of other kinds.

The 3D sensing module 100 is applied to capture the 3D image of the workpieces 400. For example, the 3D sensing module 100 can be disposed above the box 500 for capturing images of a portion of the workpieces 400 or of the entire of the workpieces 400 in the box 500. The 3D sensing module 100 can include two cameras (not shown). Each of the cameras captures two-dimensional (2D) images of the workpieces 400, then the 2D images are processed to obtain the 3D image. For example, the 2D images can be processed with a stereoscopic method. Moreover, the 2D images can be processed by an image processing unit (not shown) built in the 3D sensing module 100 or processed by the control module 300. Alternatively, the 3D sensing module 100 can include a camera and a projector or two cameras and a projector. However, the present disclosure is not limited thereto. Devices with ability to obtain 3D images can be used as the 3D sensing module 100 and within the scope of the present disclosure. Image information of the workpieces 400, such as the positions, heights, interference degrees and gripped regions of the workpieces 400 and so on, can be obtained through the 3D images. The control module 300 can determine which one of the workpieces 400 to be the target workpiece and picked up according to the image information. For example, the target workpiece can be the workpiece 400 located at the upper portion of the box and having lesser interference.

The pick-up apparatus 200 can include a main body 210 and a gripping part 220, wherein the main body 210 is connected with the gripping part 220. The main body 210 can include a robotic arm, and the robotic arm can be, but is not limited to, a six axial robotic arm. The gripping part 220 is applied to grip the workpieces 400. A structure of the gripping part 220 is adapted for the workpieces 400. As shown in FIG. 1, a center of gravity of a columnar workpiece is usually chosen as the gripped region, so that the gripping part 220 can be a gripper which can close inwardly. In other embodiments, when the gripped region includes a hole, the gripping part 220 can be a gripper which can open outwardly.

The control module 300 with capability of analysis and calculation is applied to control the 3D sensing module 100 and the pick-up apparatus 200. The control module 300 can be, but is not limited to, a central processing unit (CPU). The connection between the control module 300, the 3D sensing module 100 and the pick-up apparatus 200 can be wired connection or wireless connection. As such, the control module 300, the 3D sensing module 100 and the pick-up apparatus 200 can transmit information with one another.

The aforementioned term "interference" refers to an overlap between the workpieces 400.

The aforementioned term "interference degree" refers to an overlap degree between the workpieces 400. The greater the interference ratio is, the more serious the interference degree is. The interference ratio of a selected region of the workpiece 400 can be calculated according to following formula: interference ratio=[(overlapping area)/(overlapping area+non-overlapping area)]×100%. The overlapping area refers to a total area of portions of the workpiece 400 which overlap with the other workpieces 400 in the selected area. The non-overlapping area refers to the total area of portions of the workpiece 400 which do not overlap with the other workpieces 400 in the selected area. A sum of the overlapping area and the non-overlapping area is equal to an area of the selected region.

The aforementioned phrase "interference elimination path" refers to a virtual path set on one surface of the target workpiece to be picked up.

The aforementioned phrase "the control module 300 controls the pick-up apparatus 200 to eliminate interference of the target workpiece according to the interference elimination path" refers that the control module 300 controls a part of the pick-up apparatus 200 to approach to the surface of the target workpiece to a predetermined distance and controls the part of the pick-up apparatus 200 to displace along the interference elimination path. The part of the pick-up apparatus 200 can be the gripping part 220. For the sake of convenience, the part of the pick-up apparatus 200 is represented by the gripping part 220 hereinafter. However, the present disclosure is not limited thereto. Moreover, the predetermined distance can be adjusted flexibly. The predetermined distance is usually less than a height of the workpiece 400. However, the present disclosure is not limited thereto. A distance which allows the gripping part 220 to push away other workpieces stacked on the surface of the target workpiece when the gripping part 220 displaces can be the predetermined distance of the present disclosure. The predetermined distance can be obtained from the image information or can be set artificially. As such, when the gripping part 220 displaces along the interference elimination path, the interference of the target workpiece can be eliminated.

The aforementioned phrase "to eliminate interference of the target workpiece" refers to the interference of the target workpiece is completely eliminated or partially eliminated, such that the interference degree is reduced.

The aforementioned phrase "interference parameter" can be the interference ratio of each of the regions. The calculation method of the interference ratio can refer to the above description. Each of the regions can be regarded as a path point of the interference elimination path, and a predetermined point of each of the regions can be designated to represent each of the regions. For example, a central point of each of the regions can be designated to represent each of the regions, and the interference elimination path can be obtained by connecting the predetermined point of each of the regions according to the sorting result. According to one embodiment of the present disclosure, all the regions are arranged into the interference elimination path. As such, the gripping part 220 of the pick-up apparatus 200 can travel through all the regions with the predetermined distance, which is favorable for eliminating interference of all the regions. An area of each of the regions can be less than or equal to an area of the gripping part 220, such that the effect for eliminating interference can be enhanced.

Figure 5:
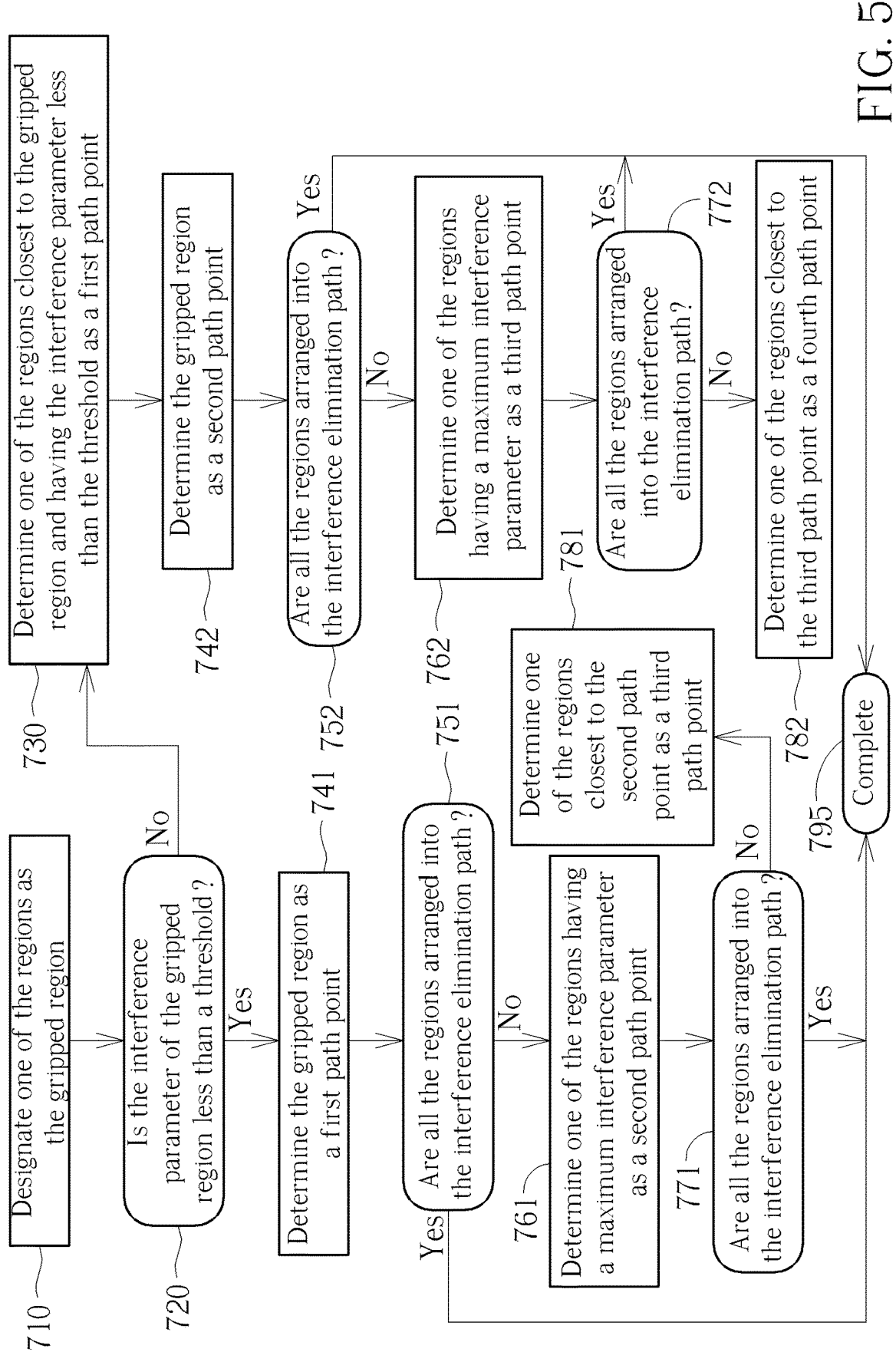
FIG. 5 is a flow chart illustrating the control module sorting regions according to an interference parameter of each of the regions.

Please refer to FIG. 5, which is a flowchart illustrating the control module sorting the regions according to the interference parameter of each of the regions. The executive subject of each of the steps below is the control module.

In Step 710, designate one of the regions as the gripped region. The gripped region can be determined according to the kind of the workpiece. For example, when the workpiece is a wrench, the gripped region can be the region where the center of gravity is located. When the workpiece has a hole, the gripped region can be the region where the hole is located.

In Step 720, determine whether the interference parameter of the gripped region is less than a threshold; if yes, go to Step 741. The threshold can be predetermined according to practical demands. According to one embodiment of the present disclosure, the threshold can be greater than or equal to the noise ratio of the 3D image, so that the misjudgment caused by the noise can be avoided.

In Step 741, determine the gripped region as a first path point of the interference elimination path.

In Step 751, determine whether all the regions are arranged into the interference elimination path; if yes, go to Step 795, the sort is complete, and the interference elimination path includes the first path point; if not, go to Step 761.

In Step 761, determine one of the regions having a maximum interference parameter as a second path point, which is according to the interference parameter of each of the regions.

In Step 771, determine whether all the regions are arranged into the interference elimination path; if yes, go to Step 795, the sort is complete, and the interference elimination path includes the first path point and the second path point; if not, go to Step 781.

In Step 781, determine one of the regions closest to the second path point as a third path point. When there are more than two regions spaced from the second path point by the same distance, arbitrary one of the regions can be selected as the third path point.

If not all the regions are arranged into the interference elimination path, repeat Step 771 and Step 783 (not shown) till all the regions are arranged into the interference elimination path. Step 771 can refer to the above description. In Step 771, if yes, go to Step 795, the sort is complete; if not, go to Step 783. In Step 783, determine one of the regions closest to the current path point (herein, the third path point) as a next path point (herein, the fourth path point). In other words, after the second path point, the region closest to the current path point is determined as the next path point.

Please return to Step 720, when the interference parameter of the gripped region is greater than or equal to the threshold, go to Step 730, in which determine one of the regions closest to the gripped region and having the interference parameter less than the threshold as a first path point of the interference elimination path. When there are more than two regions spaced from the gripped region by the same distance, arbitrary one of the regions or the region having a minimum interference parameter can be selected as the first path point.

In Step 742, determine the gripped region as a second path point.

In Step 752, determine whether all the regions are arranged into the interference elimination path; if yes, go to Step 795, the sort is complete, and the interference elimination path includes the first path point and the second path point; if not, go to Step 762.

In Step 762, determine one of the regions having a maximum interference parameter as a third path point, which is according to the interference parameter of each of the region.

In Step 772, determine whether all the regions are arranged into the interference elimination path; if yes, go to Step 795, the sort is complete, and the interference elimination path includes the first path point, the second path point and the third path point; if not, go to Step 782.

In Step 782, determine one of the regions closest to the third path point as a fourth path point.

If not all the regions are arranged into the interference elimination path, repeat Step 772 and Step 784 (not shown) till all the regions are arranged into the interference elimination path. Step 772 can refer to the above description. In Step 772, if yes, go to Step 795, the sort is complete; if not, go to Step 784. In Step 784, determine one of the regions closest to the current path point (herein, the fourth path point) as a next path point (herein, the fifth path point). In other words, after the third path point, the region closest to the current path point is determined as the next path point. Moreover, before all the regions are arranged into the interference elimination path, each of the regions is not repeatedly arranged into the interference elimination path, such that the efficiency and the effect for eliminating interference can be balanced.

Figure 6:
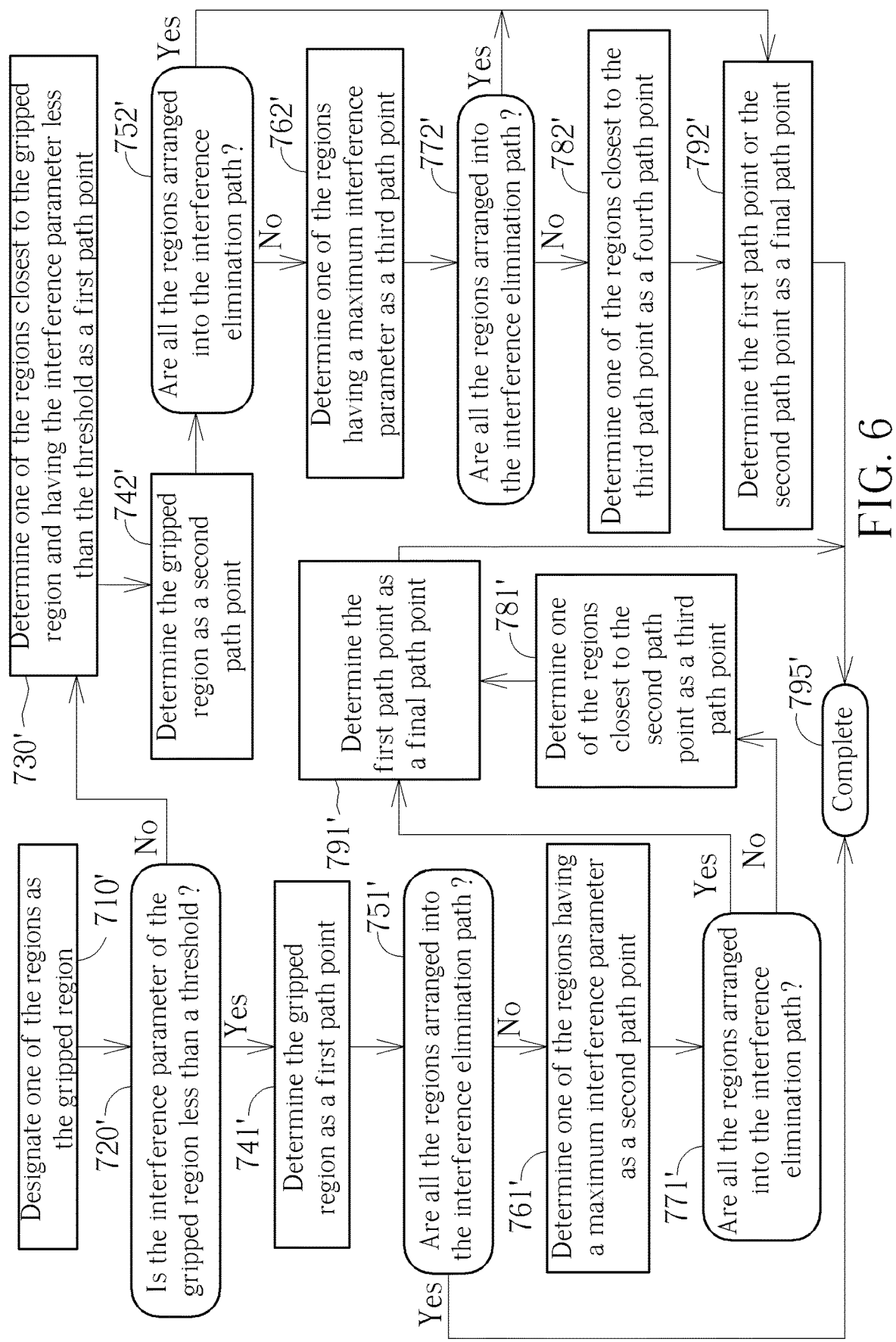
FIG. 6 is another flow chart illustrating the control module sorting the regions according to the interference parameter of each of the regions.

Please refer to FIG. 6, which is another flow chart illustrating the control module sorting the regions according to the interference parameter of each of the regions. Step 710' to 782' and Step 795' can refer to Step 710 to 782 and Step 795. After Step 781' or 782', if not all the regions are arranged into the interference elimination path, repeat Steps 772' and 783' (not shown) or repeat Steps 772' and 784' (not shown) till all the regions are arranged into the interference elimination path. Steps 772', 783' and 784' are identical to Steps 772, 783 and 784, respectively. Thus, Step 772', 783' and 784' are not repeated herein. Compared to FIG. 5, FIG. 6 further includes Step 791' or 792' after all the regions are arranged into the interference elimination path. In Step 791', determine the first path point as a final path point of the interference elimination path. In Step 792', determine the first path point or the second path point as a final path point of the interference elimination path. As such, it can prevent the workpieces which have been eliminated from the target workpiece from being pushed back to the target workpiece during the process of eliminating interference, which can further enhance the effect of interference elimination.

After the sort is complete, the interference elimination path can be obtained by connecting all the regions according to the sorting result. Then the control module transmits the interference elimination path to the pick-up apparatus.

The following first to fourth examples are provided to explain how the interference is eliminated by the system according to the present disclosure. In the first to fourth examples, the interference parameter is the interference ratio of each of the regions, the threshold is defined as 30%, and each of the regions is represented by the central point thereof.

Figure 7:
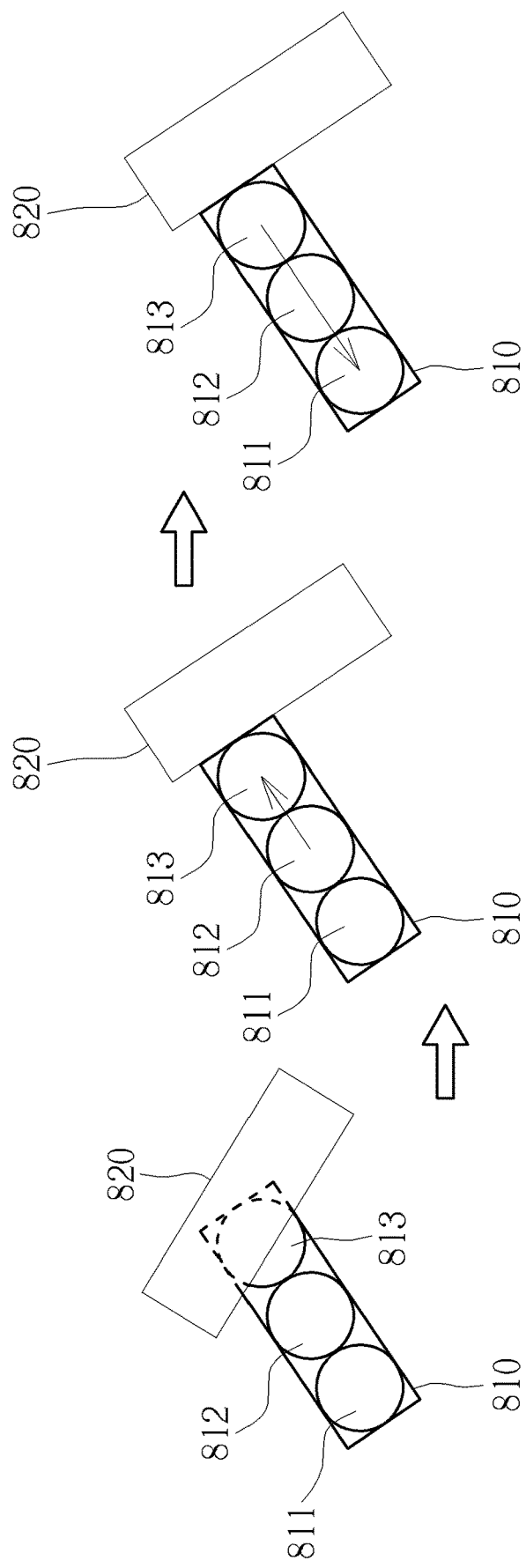
FIG. 7 is a schematic diagram illustrating how to eliminate interference according the first example of the present disclosure.

FIG. 7 is a schematic diagram illustrating how to eliminate interference according the first example of the present disclosure. The left part of FIG. 7 shows a state before eliminating interference. The middle part and the right part of FIG. 7 show the displacement paths of the gripping part. As shown in the left part of FIG. 7, the workpiece 810 is the target workpiece to be picked up, and the workpiece 820 stacks on the workpiece 810 so as to form interference. The control module divides the workpiece 810 into regions 811-813, calculates an interference parameter of each of the regions 811-813, and sorts the regions 811-813 according to the flow chat of FIG. 5.

Please refer to the left part of FIG. 7 and FIG. 5 simultaneously. First, Step 710 is performed to designate the region 812 as the gripped region. Second, Step 720 is performed to determine whether the interference parameter of the gripped region (i.e., the region 812) is less than the threshold; because the determination is yes, go to Step 741 to determine the region 812 as the first path point of the interference elimination path. Step 751 is performed to determine whether all the regions 811-813 are arranged into the interference elimination path; because the determination is no, go to Step 761 to determine the region 813 having the maximum interference parameter as the second path point. Step 771 is performed to determine whether all the regions 811-813 are arranged into the interference elimination path; because the determination is no, go to Step 781 to determine the region closest to the second path point (i.e., the region 813) as the third path point. Because only the region 811 is not sorted, determine the region 811 as the third path point.

Therefore, the interference elimination path is in the order of the regions 812, 813 and 811. When the sort is complete, the control module transmits the interference elimination path to the pick-up apparatus, and controls the gripping part of the pick-up apparatus to displace according to the interference elimination path. As shown the middle part of FIG. 7, the gripping part displaces from the region 812 to the region 813, so that the workpiece 820 is pushed away from the region 813. As shown the right part of FIG. 7, the gripping part displaces from the region 813 to the region 811. Therefore, the gripping part travels all the regions 811-813 of the workpiece 810, it can ensure that the interference of all the regions 811-813 have been eliminated, which is favorable for the gripping operation of the pick-up apparatus.

Figure 8:
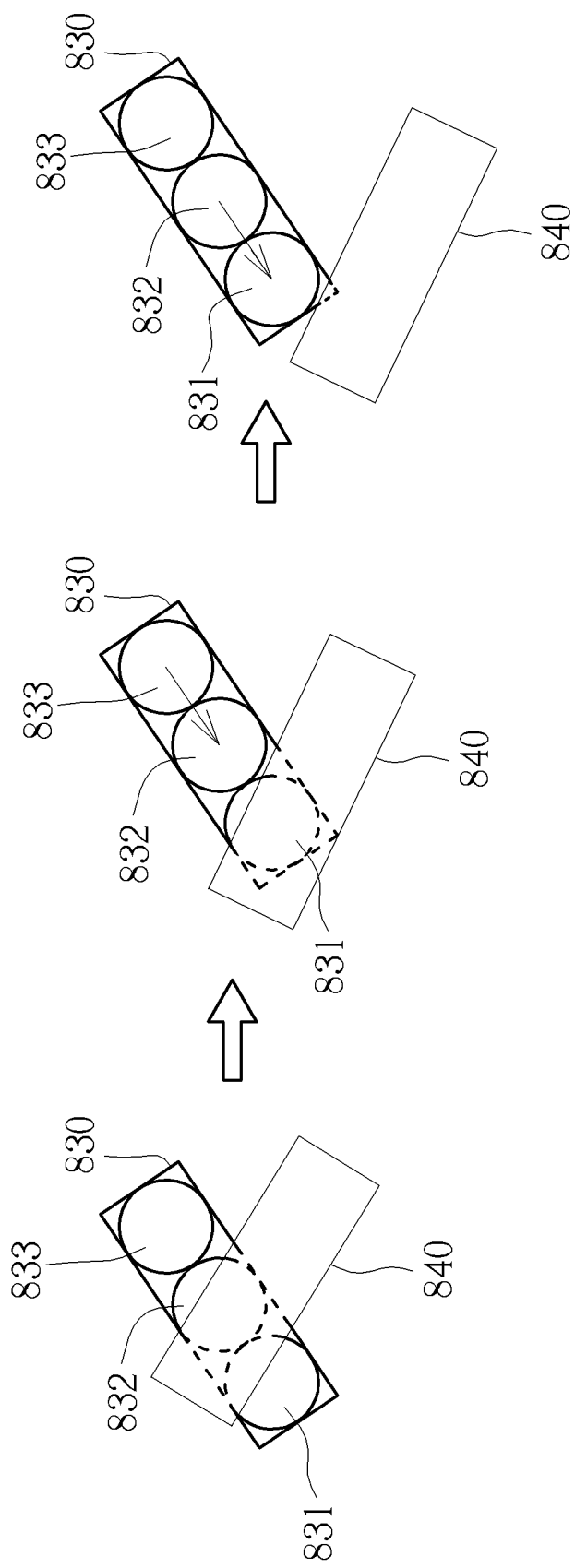
FIG. 8 is a schematic diagram illustrating how to eliminate interference according the second example of the present disclosure.

FIG. 8 is a schematic diagram illustrating how to eliminate interference according the second example of the present disclosure. As shown in the left part of FIG. 8, the workpiece 830 is the target workpiece to be picked up, and the workpiece 840 stacks on the workpiece 830 so as to form interference. The control module divides the workpiece 830 into regions 831-833, calculates an interference parameter of each of the regions 831-833, and sorts the regions 831-833 according to the flow chat of FIG. 5. Please refer to the left part of FIG. 8 and FIG. 5 simultaneously. First, Step 710 is performed to designate the region 832 as the gripped region. Second, Step 820 is performed to determine whether the interference parameter of the gripped region (i.e., the region 832) is less than the threshold; because the determination is no, go to Step 730 to determine the region 833 closest to the region 832 and having the interference parameter less than the threshold as the first path point of the interference elimination path. Step 742 is performed to determine the region 832 as the second path point. Step 752 is performed to determine whether all the regions 831-833 are arranged into the interference elimination path; because the determination is no, go to Step 762 to determine the region having the maximum interference parameter as the third path point. Because only the region 831 is not sorted, determine the region 831 as the third path point. As such, the interference elimination path is in the order of regions 833, 832 and 831.

As shown in the middle part and the right part of FIG. 8, the gripping part displaces from the region 833 to the region 832, then to the region 831, so that the workpiece 840 is firstly pushed away from the region 832, then the workpiece 840 is pushed away from the region 831. AS such, the interference degree formed by the workpiece 840 becomes extremely low, which does not affect the gripping operation of the pick-up apparatus.

Figure 9:
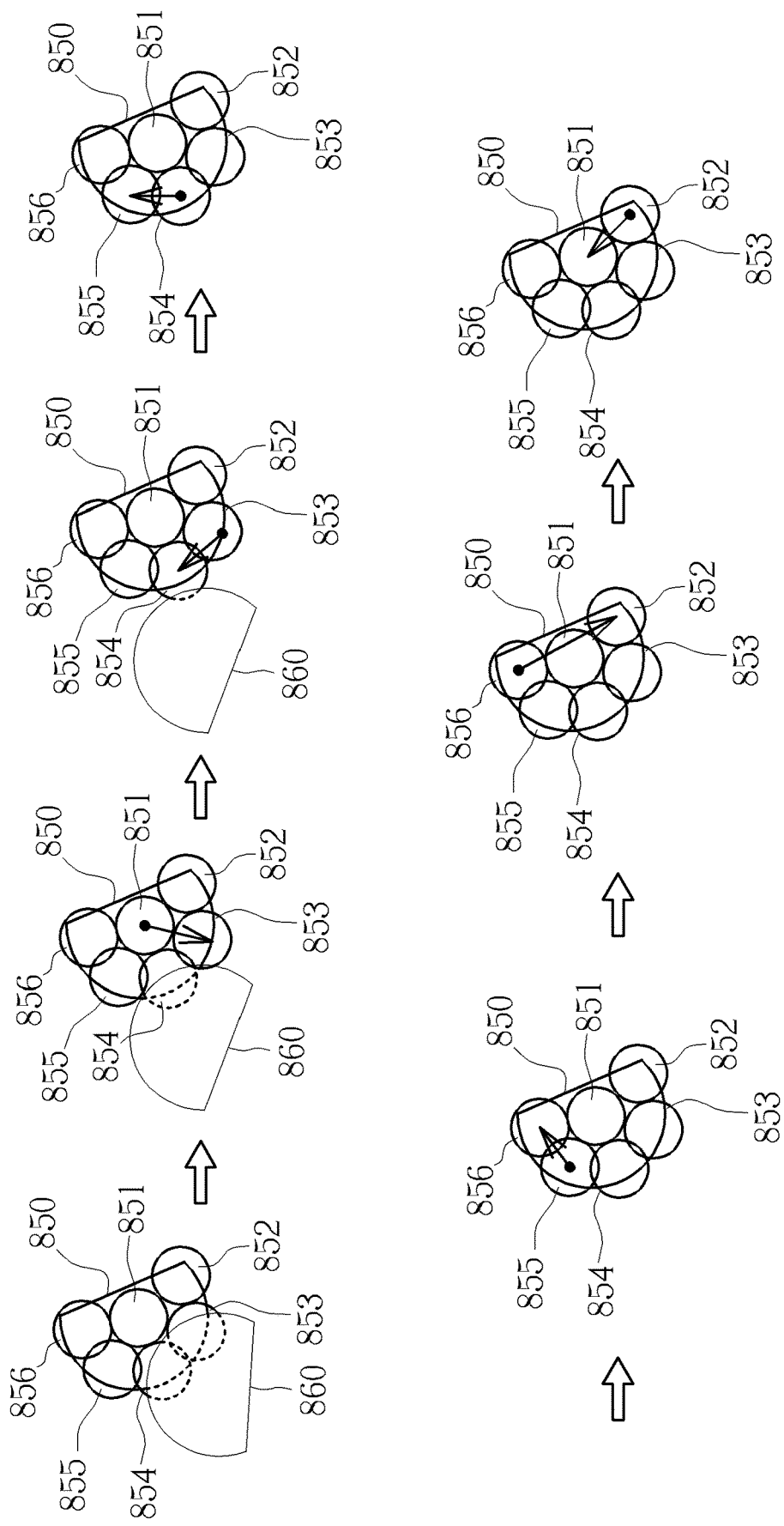
FIG. 9 is a schematic diagram illustrating how to eliminate interference according the third example of the present disclosure.

FIG. 9 is a schematic diagram illustrating how to eliminate interference according the third example of the present disclosure. The leftmost part of the upper raw of FIG. 9 shows a state before eliminating interference. The remaining parts of FIG. 9 show the displacement paths of the gripping part. As shown in the remaining parts of FIG. 9, the workpiece 860 is no longer depicted after being pushed away from the workpiece 850.

As shown in the leftmost part of the upper raw of FIG. 9, the workpiece 850 is the target workpiece to be picked up, and the workpiece 860 stacks on the workpiece 850 so as to form interference. The control module divides the workpiece 850 into regions 851-856, calculates an interference parameter of each of the regions 851-856, and sorts the regions 851-856 according to the flow chat of FIG. 6. Please refer to the leftmost part of the upper raw of FIG. 9 and FIG. 6 simultaneously. First, Step 710' is performed to designate the region 851 as the gripped region. Second, Step 720' is performed to determine whether the interference parameter of the gripped region (i.e., the region 851) is less than the threshold; because the determination is yes, go to Step 741' to determine the region 851 as the first path point of the interference elimination path. Step 751' is performed to determine whether all the regions 851-856 are arranged into the interference elimination path; because the determination is no, go to Step 761' to determine the region 853 having the maximum interference parameter d as the second path point. Step 771' is performed to determine whether all the regions 851-856 are arranged into the interference elimination path; because the determination is no, go to Step 781' to determine the region 854 closest to the second path point (i.e., the region 853) as the third path point. Afterward, repeat Step 771' and 783' (not shown) till all the regions 851-856 are arranged into the interference elimination path. Details of Step 771' and Step 783' can refer to that of Step 771 and Step 783, respectively. As such, the control module determines the region 855 as the fourth path point, the region 856 as the fifth path point and the region 852 as the sixth path point. When all the regions 851-856 are arranged into the interference elimination path, Step 791' is performed to determine the first path point (i.e., the region 851) as the final path point of the interference elimination path. That is, the interference elimination path is in the order of the regions 851, 853, 854, 855, 856, 852 and 851. Afterwards, as shown in the arrows of the workpiece 850 of the remaining parts of FIG. 9, the gripping part displaces according to the interference elimination path, and the interference formed by the workpiece 860 is successfully removed.

Figure 10:
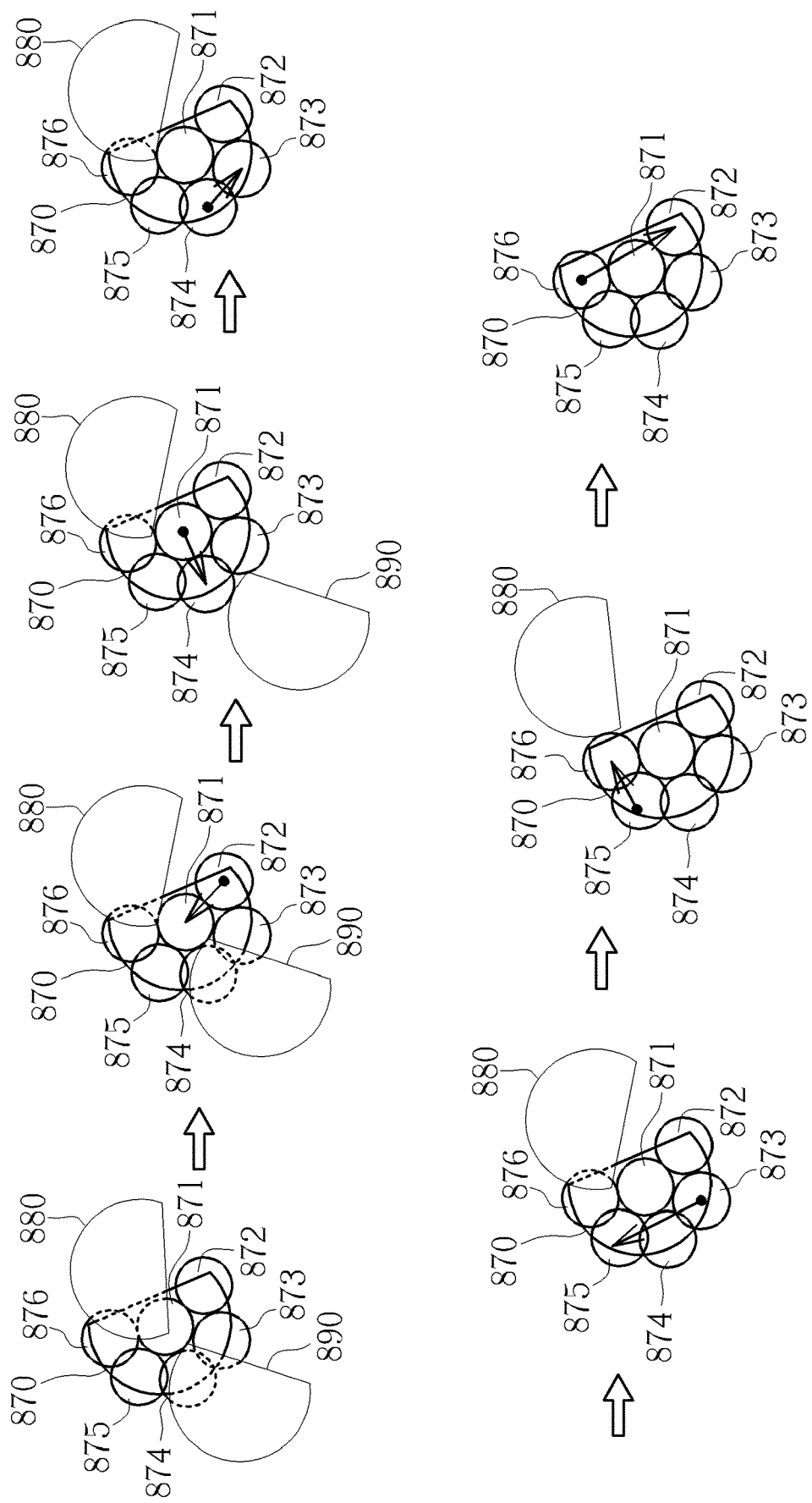
FIG. 10 is a schematic diagram illustrating how to eliminate interference according the fourth example of the present disclosure.

FIG. 10 is a schematic diagram illustrating how to eliminate interference according the fourth example of the present disclosure. The leftmost part of the upper raw of FIG. 10 shows a state before eliminating interference. The remaining parts of FIG. 10 show the displacement paths of the gripping part. As shown in the remaining parts of FIG. 10, the workpieces 880 and 890 are no longer depicted after being pushed away from the workpiece 870.

As shown in the leftmost part of the upper raw of FIG. 10, the workpiece 870 is the target workpiece to be picked up, and the workpieces 880 and 890 stack on the workpiece 870 so as to form interference. The control module divides the workpiece 870 into regions 871-876, calculates an interference parameter of each of the regions 871-876, and sorts the regions 871-876 according to the flow chat of FIG. 6. Please refer to the leftmost part of the upper raw of FIG. 10 and FIG. 6 simultaneously. First, Step 710' is performed to designate the region 871 as the gripped region. Second, Step 720' is performed to determine whether the interference parameter of the gripped region (i.e., the region 871) is less than the threshold; because the determination is no, go to Step 730' to determine the region 872 closest to the region 871 and having the interference parameter less than the threshold as the first path point of the interference elimination path. Step 742' is performed to determine the region 871 as the second path point. Step 752' is performed to determine whether all the regions 871-876 are arranged into the interference elimination path; because the determination is no, go to Step 762' to determine the region 874 having the maximum interference parameter as the third path point. Step 772' is performed to determine whether all the regions 871-876 are arranged into the interference elimination path; because the determination is no, go to Step 782' to determine the region 873 closest to the third path point (i.e., the region 874) as the fourth path point. Afterwards, repeat Step 772' and 784' (not shown) till all the regions 871-876 are arranged into the interference elimination path. Details of Step 772' and Step 784' can refer to that of Step 772 and Step 784, respectively. As such, the control module determines the region 875 as the fifth path point, and the region 876 as the sixth path point. When all the regions 871-876 are arranged into the interference elimination path, Step 792' is performed to determine the first path point (i.e., the region 872) as the final path point of the interference elimination path. That is, the interference elimination path is in the order of the regions 872, 871, 874, 873, 875, 876 and 872. Afterwards, as shown in the arrows of the workpiece 870 of the remaining parts of FIG. 10, the gripping part displaces according to the interference elimination path, and the interference formed by the workpieces 880 and 890 is successfully removed.

Compared to the prior art, the system according to the present disclosure can be applied to grip workpieces which are randomly stacked. The workpieces are not required to be arranged in advance, which can save labors and time. Moreover, the interference elimination path for the target workpiece to be picked up efficiently facilitates the interference of the target workpiece to be eliminated, such that the success probability of the grip of the pick-up apparatus and the production efficiency can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for eliminating interference of randomly stacked workpieces, comprising:
   a three-dimensional sensing module;
   a pick-up apparatus; and
   a control module coupled to the three-dimensional sensing module and the pick-up apparatus, and the control module being configured to:
      control the three-dimensional sensing module to capture a three-dimensional image, wherein the three-dimensional image is formed by capturing at least one portion of the workpieces;
      analyze the three-dimensional image to obtain an image information;
      select a target workpiece to be picked up according to the image information;
      arrange an interference elimination path for the target workpiece, comprising:
         the control module dividing the target workpiece into a plurality of regions;
         the control module calculating an interference parameter of each of the regions; and
         the control module sorting the regions according to the interference parameter of each of the regions to obtain a sorting result, and the control module obtaining the interference elimination path by connecting the regions according to the sorting result; and
      control the pick-up apparatus to displace at least one workpiece causing interference with the target workpiece along the interference elimination path to eliminate interference of the target workpiece, such that the at least one workpiece causing interference with the target workpiece is pushed away from the target workpiece.

2. The system of claim 1, wherein the control module sorting the regions according to the interference parameter of each of the regions comprises:
   the control module designating one of the regions as a gripped region; and
   the control module determining if the interference parameter of the gripped region is less than a threshold, wherein:
      when the interference parameter of the gripped region is less than the threshold, the control module determines the gripped region as a first path point of the interference elimination path; and
      the control module determines one of the regions having a maximum interference parameter as a second path point according to the interference parameter of each of the regions;
   wherein the interference elimination path comprises the first path point and the second path point.

3. The system of claim 2, wherein the control module sorting the regions according to the interference parameter of each of the regions further comprises:
   the control module determining one of the regions closest to the second path point as a third path point;
   wherein the interference elimination path further comprises the third path point.

4. The system of claim 3, wherein the control module sorting the regions according to the interference parameter of each of the regions further comprises:
   the control module determines the first path point as a final path point of the interference elimination path.

5. The system of claim 2, wherein the control module sorting the regions according to the interference parameter of each of the regions further comprises:
   the control module determines the first path point as a final path point of the interference elimination path.

6. The system of claim 1, wherein the control module sorting the regions according to the interference parameter of each of the regions comprises:
the control module designating one of the regions as a gripped region; and
the control module determining if the interference parameter of the gripped region is less than a threshold, wherein:
when the interference parameter of the gripped region is greater than or equal to the threshold, the control module determines one of the regions closest to the gripped region and having the interference parameter less than the threshold as a first path point of the interference elimination path, and the control module determines the gripped region as a second path point; and
the control module determines one of the regions having a maximum interference parameter as a third path point according to the interference parameter of each of the regions;
wherein the interference elimination path comprises the first path point, the second path point and the third path point.

7. The system of claim 6, wherein the control module sorting the regions according to the interference parameter of each of the regions further comprises:
the control module determining one of the regions closest to the third path point as a fourth path point;
wherein the interference elimination path further comprises the fourth path point.

8. The system of claim 7, wherein the control module sorting the regions according to the interference parameter of each of the regions further comprises:
the control module determines the first path point or the second path point as a final path point of the interference elimination path.

9. The system of claim 6, wherein the control module sorting the regions according to the interference parameter of each of the regions further comprises:
the control module determines the first path point or the second path point as a final path point of the interference elimination path.

10. The system of claim 1, wherein the interference parameter is an interference ratio of each of the regions.

* * * * *